United States Patent [19]

Madden et al.

[11] 4,423,632
[45] Jan. 3, 1984

[54] METHOD AND APPARATUS TO DETERMINE THE IMBALANCE IN A ROTATING OBJECT

[75] Inventors: Allen C. Madden, Woodside; Albert L. Mitchell, San Jose, both of Calif.

[73] Assignee: QYL Inc., Santa Clara, Calif.

[21] Appl. No.: 238,091

[22] Filed: Feb. 25, 1981

[51] Int. Cl.³ .............................................. G01M 1/22
[52] U.S. Cl. ................................................... 73/462
[58] Field of Search ................................. 73/462–466

[56] References Cited

U.S. PATENT DOCUMENTS

| 2,378,018 | 6/1945 | Inman | 73/66 |
|---|---|---|---|
| 2,828,911 | 4/1958 | Lash | 235/61 |
| 3,102,429 | 9/1963 | Hardy et al. | 73/462 |
| 3,478,602 | 11/1969 | Tatum | 73/462 |
| 3,724,279 | 4/1973 | Woolley | 73/462 |
| 3,774,456 | 11/1973 | Crump | 73/462 |
| 3,812,725 | 5/1974 | Frank et al. | 73/462 |
| 3,835,712 | 9/1974 | Muller | 73/462 |
| 3,910,121 | 10/1975 | Curchod et al. | 73/462 |
| 3,911,751 | 10/1975 | Shooter et al. | 73/464 |
| 3,922,922 | 12/1975 | Goebel | 73/462 |
| 3,991,620 | 11/1976 | Fencl et al. | 73/462 |
| 4,173,146 | 11/1979 | Kogler et al. | 73/462 |
| 4,191,055 | 11/1980 | Orem et al. | 73/462 |
| 4,201,091 | 5/1980 | Guyot et al. | 73/462 |

FOREIGN PATENT DOCUMENTS 939693 10/1963 United Kingdom .
1247596 9/1971 United Kingdom .

Primary Examiner—Herbert Goldstein
Attorney, Agent, or Firm—Limbach, Limbach & Sutton

[57] ABSTRACT

An apparatus to determine the imbalance in a rotating object, such as a tire, has means to support the object and drive means directly coupled to the support means for accelerating the object. Means for removing power to the drive means and force transducer means for continuously measuring the magnitude of the imbalance of the object as the velocity of the object decreases, are also provided.

26 Claims, 15 Drawing Figures

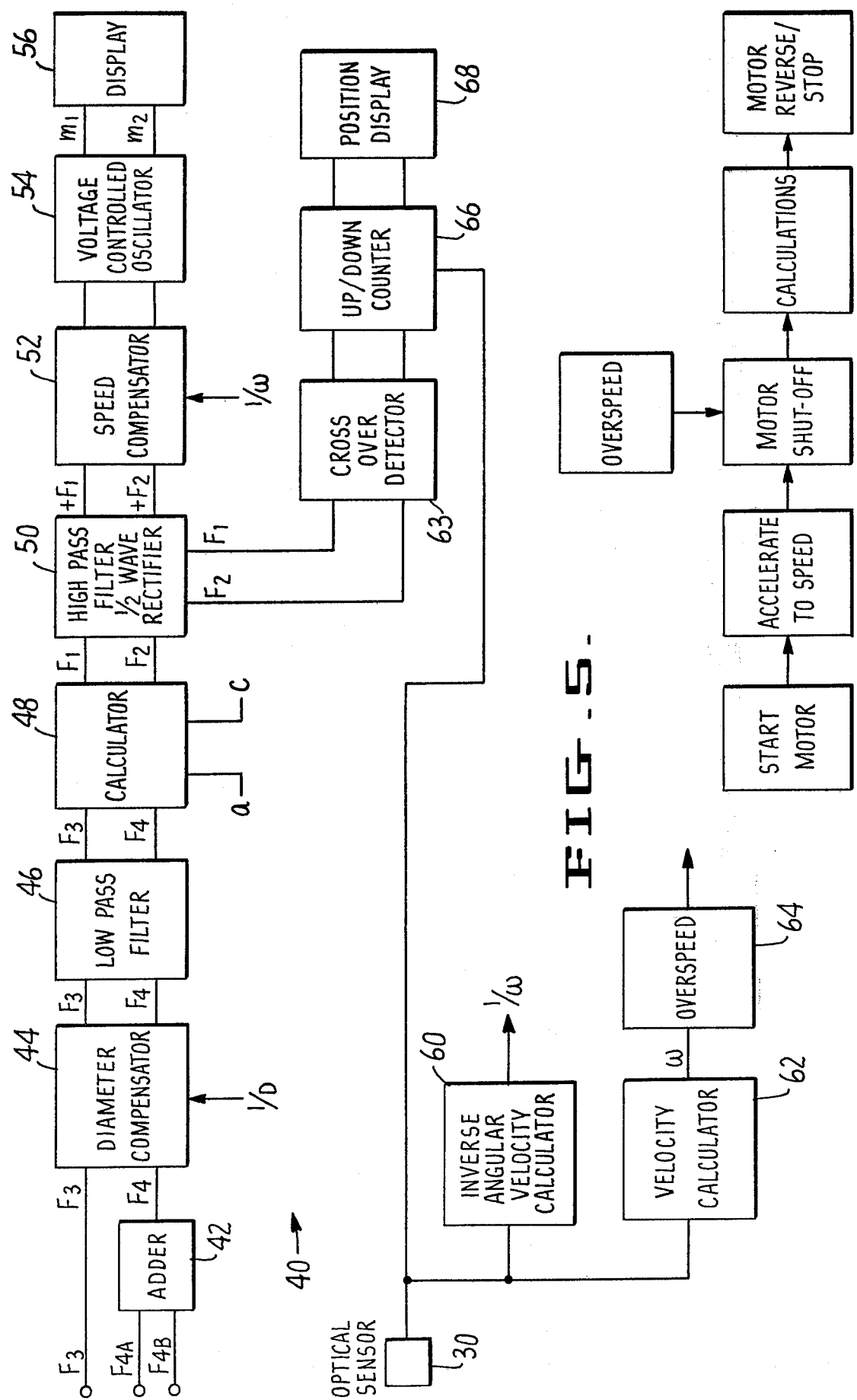

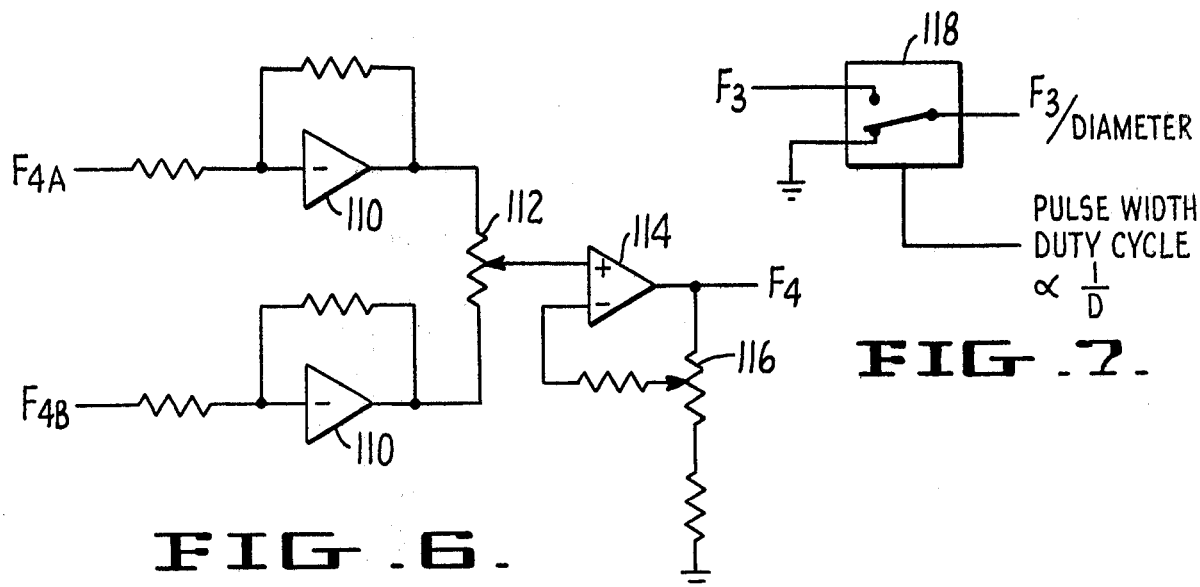
FIG. 6.
FIG. 7.
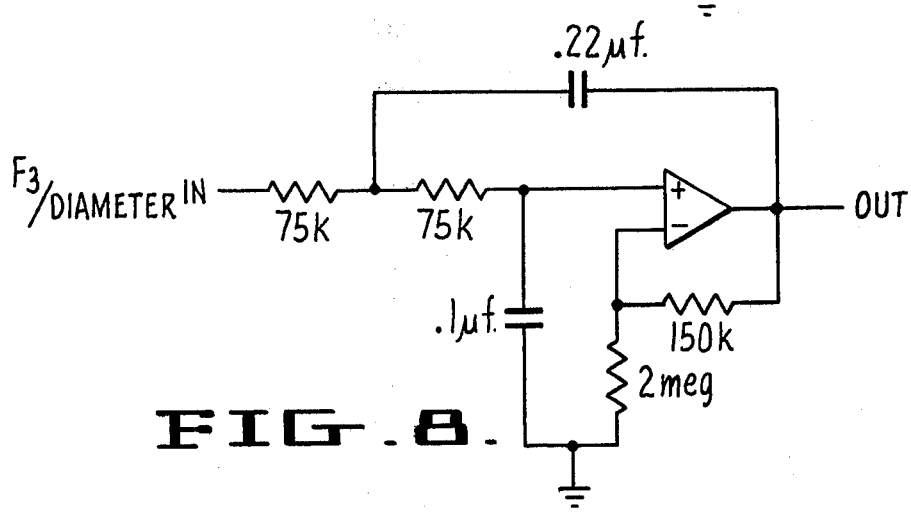
FIG. 8.
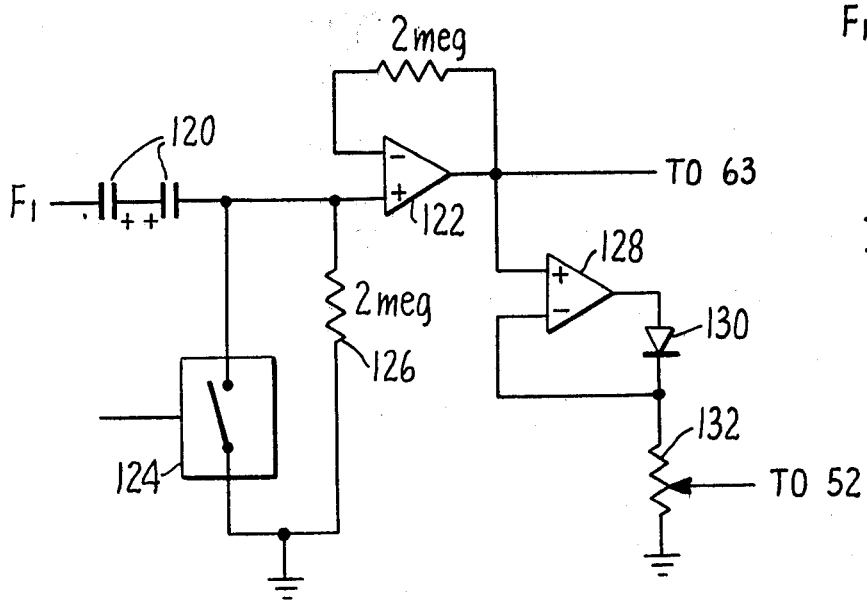
FIG. 10.
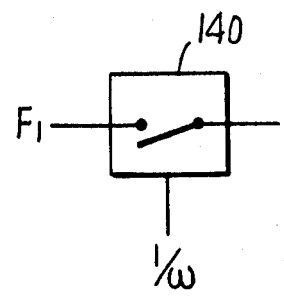
FIG. 11

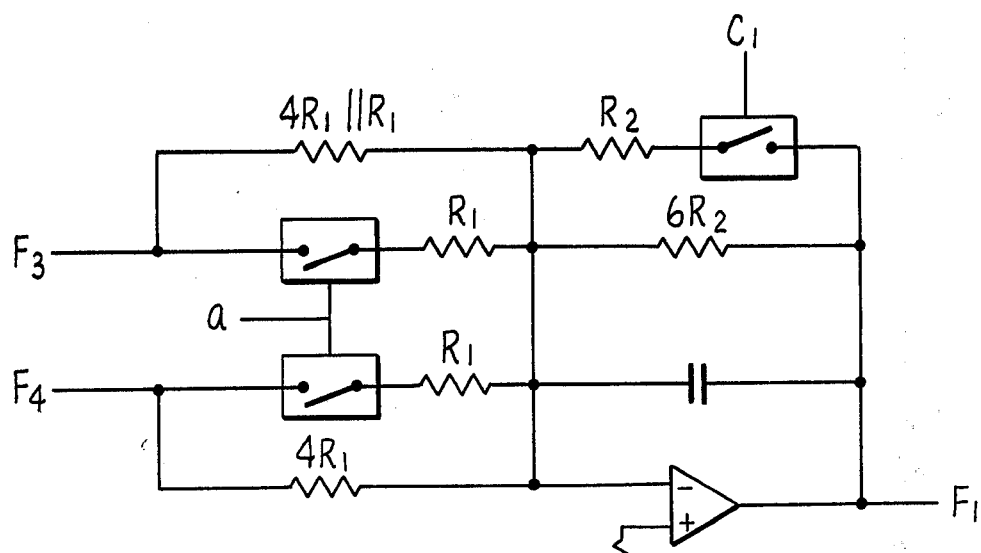
FIG. 9a.
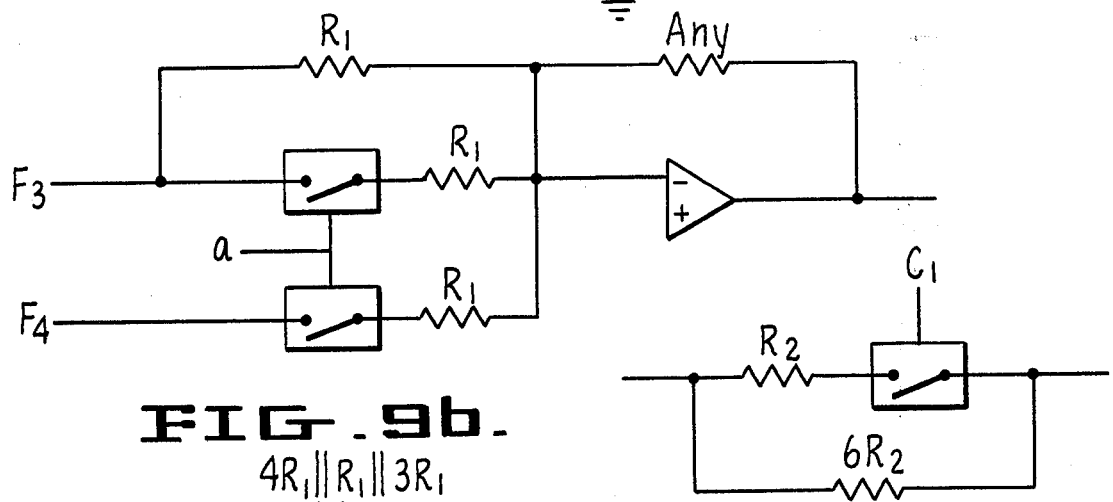
FIG. 9b.
FIG. 9c.
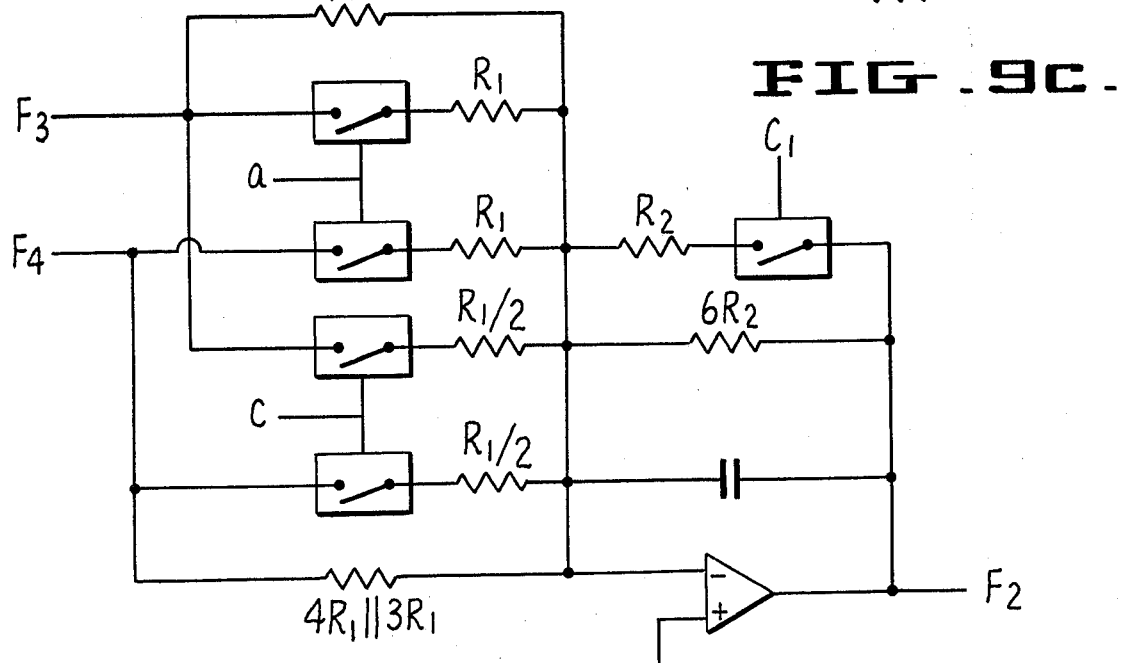
FIG. 9d.

METHOD AND APPARATUS TO DETERMINE THE IMBALANCE IN A ROTATING OBJECT

BACKGROUND OF THE INVENTION

The present invention relates to a method and apparatus for determining the imbalance in a rotating object, and, more particularly, to a method and apparatus for determining the mass of imbalance in a rotating tire.

Apparatus to determine the mass of imbalance in a rotating tire are well known. See, for example, Great Britain Pat. No. 939,693 and Great Britain Pat. No. 1,247,596. See additionally U.S. Pat. Nos. 2,378,018; 2,828,911; 3,102,429; 3,724,279; 3,812,725; 3,835,712; 3,910,121; 3,911,751; 3,922,922; 3,991,620; and 4,173,146. All of the foregoing patents teach an apparatus to measure the force of imbalance of a rotating object, such as a tire. The apparatus is, in general, of two types. The first type is in which the drive means is indirectly connected, through a coupling means, such as a pulley or a transmission, to the tire. The drive means is indirectly coupled to the rotating tire because measurements are usually made at low rotational speed, such as 200 rpm or 500 rpm. This is desired for safety purposes as well as for quick cycle times. Typically, small inexpensive motors are used. In the second type of apparatus of the prior art, such as U.S. Pat. No. 3,182,725, the drive means is directly coupled to the rotating tire. From the standpoint of mechanical stability, and accuracy of measurement, measurements of the forces of imbalance on a rotating tire are best made when the drive means is directly coupled to the rotating tire.

However, in all of the references heretofore mentioned, the practice has been to accelerate the rotating tire to a preselected, desired velocity, or to accelerate the rotating tire to a velocity faster than that which is desired and then let the tire slow down. As the tire reaches the desired velocity, measurements are then made at those specified velocities. Typically, the measurements are made at 500 rpm. In the prior art, the forces of imbalance of the rotating tire are made at preselected, specified velocities, because the signal processing by the electronic means is simplified. Having a preselected specific velocity to measure the force of imbalance of the rotating tire means that one could construct an electronic filter with the desired filter frequency. The filter would permit electronic signals at that frequency to pass relatively uninhibited, while blocking the background or electronic noise. In addition, measurements of the forces of imbalance made at preselected velocities overcome phase-shift problems. Although such a system overcomes the problems of electronic noise and phase shift by appropriately selecting the electronic filter, thereby specifying the frequency of rotation at which measurements of the force of imbalance are made, there is sacrifice in the accuracy in the system inasmuch as the measurement is made for a very brief period of time. The speed of the rotating tire is constantly decreasing, and thus at the specified, preselected velocity, there would be only a brief short period of time to measure of the force of imbalance on the rotating tire. This, of course, serves as a source of error.

SUMMARY OF THE INVENTION

Therefore, in accordance with the present invention, an apparatus to determine the imbalance in a rotating object comprises means for supporting the object, and drive means directly coupled to the support means for accelerating the object. The apparatus further comprises means for removing the power to the drive means and force transducer means for continuously measuring the magnitude of the imbalance of the object as the velocity of the object decreases.

The present invention also comprises a method of operating the foregoing apparatus.

BRIEF DESCRIPTION OF THE DRAWINGS

FIG. 4 is a block diagram of the overall electrical schematic of the apparatus of the present invention.

FIG. 5 is a block diagram of the electronics used in the apparatus of the present invention to calculate and to display the measurements of the imbalance.

FIG. 6 is one embodiment of the circuit for the adder used in the present invention.

FIG. 7 is one embodiment of the circuit for the diameter compensator used in the present invention.

FIG. 8 is one embodiment of a low pass filter used in the present invention.

FIG. 9(a) is one embodiment of a calculator used in the present invention; 9(b) and 9(c) are portions of FIG. 9(a); 9(d) is one embodiment of another calculator used in the present invention.

FIG. 10 is one embodiment of a high pass filter, half-wave rectifier used in the present invention.

FIG. 11 is one embodiment of a speed compensator used in the present invention.

DETAILED DESCRIPTION OF THE INVENTION

Figure 1:
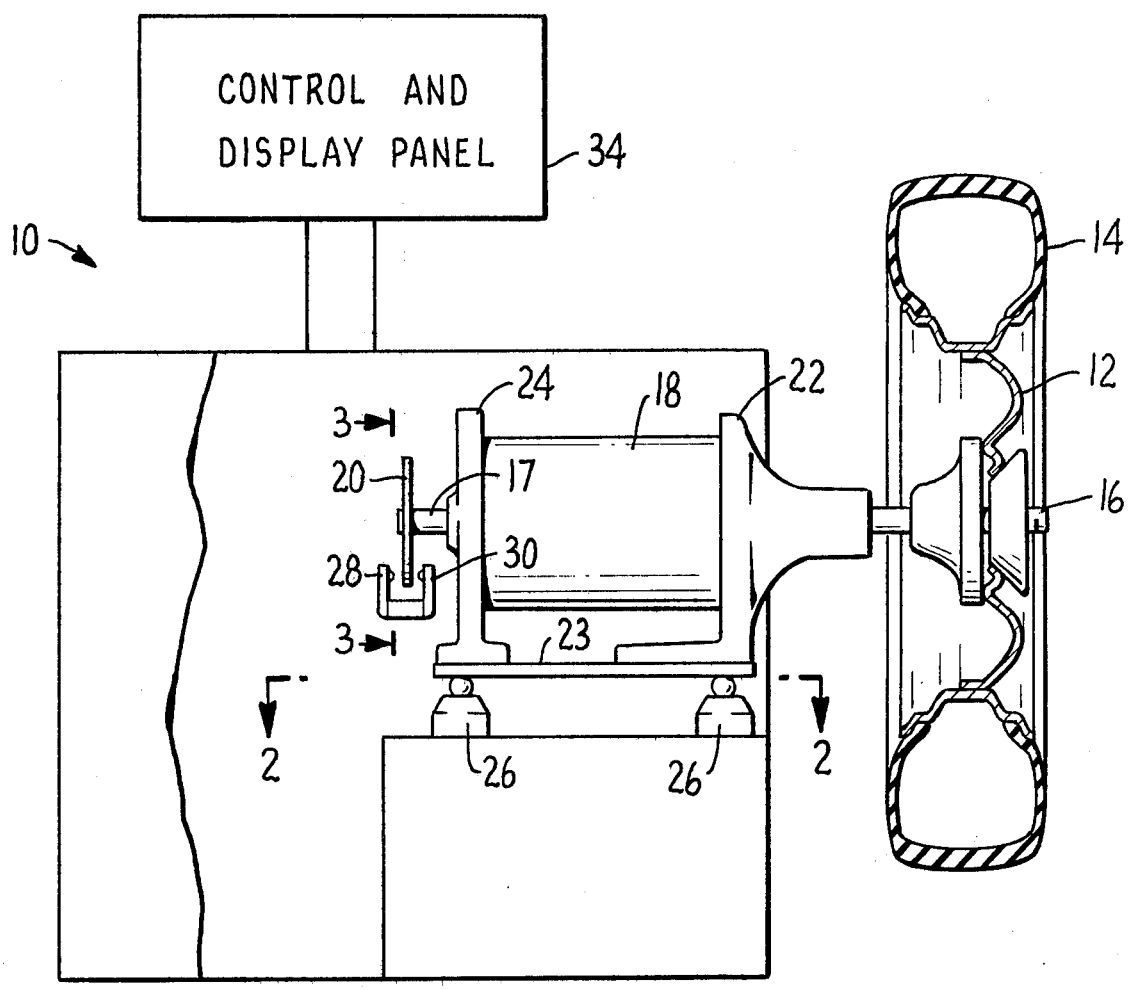
FIG. 1 is a partially cut away side view of the apparatus of the present invention.
Figures 2, 3:
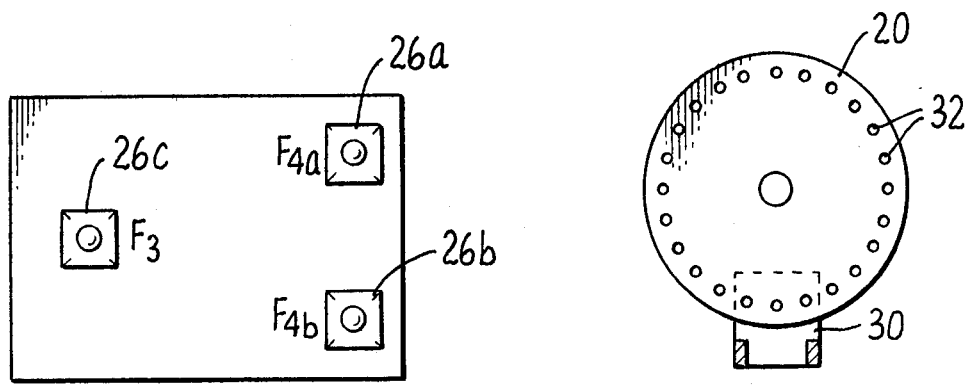
FIG. 2 is a sectional view of a portion of the apparatus shown in FIG. 1 taken along the line 2—2.
FIG. 3 is a sectional view of a portion of the apparatus shown in FIG. 1 taken along the line 3—3.

Referring to FIG. 1, there is shown an apparatus 10 of the present invention. The apparatus 10 is particularly adapted to measure the forces of imbalance of a wheel 12 with tire 14 attached thereto. The wheel 12 is mounted on a solid cantilevered shaft 16 at one end. An induction squirrel-cage type motor 18 (for example: eight-pole asynchronous motor) is directly coupled to the shaft 16 at another end. The motor 18 is supported by a first rigid frame 22 near said tire 14 and by a second rigid frame 24 away from said tire 14. The first and second rigid frames 22 and 24, respectively are connected by a horizontal plate 23 on which the motor 18 rests. The motor 18 is restrained from moving in either of the horizontal directions by the horizontl plate 23. The motor 18 and the frames 22 and 24 attached thereto along with the horizontal plate 23 (hereinafter collectively referred to as the motor 18) rest on a plurality of force transducers 26. The force transducers 26 may be of any well known type of transducer that is capable of detecting forces exerted thereon. In the embodiment shown in FIG. 1, the transducers 26 respond to forces exerted thereon in the vertical direction only. However, it should be apparent that the transducers 26 may also be positioned to respond to horizontal forces only. In response to forces exerted thereon, each transducer 26 produces an electrical signal as its output. Typically, the transducers can be piezoelectric, capacitive, variable reluctance, resistive strain gauge, or other types. In the preferred embodiment, three piezoelectric transducers $26(a-c)$ are used. The position of the transducers $26(a-c)$ is shown in FIG. 2. A first and second transducers $26a$ and $26b$ respectively are positioned in a line substantially perpendicular to the shaft 16 and closer to one end of the motor 18 near the wheel 12. Third transducer $26c$ is positioned at a point approximately midway between the first and second transducers $26a$ and $26b$ respectively and closer to the other end of the motor 18. A toothed wheel 20 is attached to the other end of motor 18. The toothed wheel 20 shown in FIG. 3 is a rotational angle transducer for determining the angular position of the motor 18. At a fixed location, an optical source 28, such as a light bulb, emits a beam of light directed to an optical sensor 30 passing through the toothed wheel 20. The toothed wheel 20 has a plurality of apertures 32, equidistant from one another. As the wheel 20 rotates, the apertures 32 interrupt the beam from the optical source 28 to the sensor 30 as well as permits the beam to be transmitted therethrough depending on the position of the toothed wheel 20 which is dependent on the rotation of the motor shaft 17 connected to the motor 18. Such a system is well known in the art; see, for example, U.S. Pat. No. 3,910,121, to determine the angular position of the rotating shaft which is connected to the rotating motor.

In the operation of the apparatus 10 of the present invention, the motor 18 is started and is accelerated to a speed which is desired for determining the force of imbalance on the wheel 12. Typically, this is at about 500 rpm. The motor 18 is then switched off and the wheel 12 is then permitted to "free-wheel", i.e., the rotating wheel 12 is allowed to rotate freely. Since there is bound to be some friction in the shaft coupled to the motor 18, and other places, the wheel 12 as it rotates begins to slow down. The wheel 12 is permitted to free-wheel approximately four revolutions before measurements are made. This permits the system to "settle down". After this initial period, measurements of the magnitude of the force of imbalance are then made continuously by the force transducers $26(a-c)$. As these force measurements are made continuously, calculations of the forces of imbalance are also made continuously by the electronic calculating means 40 incorporated in the apparatus of the present invention. After approximately another eight (8) revolutions, the motor 18 is reactivated to brake the rotating wheel 12 to a standstill. The total free-wheel time is about one and one-half seconds. The results of the measurement made by the electronic means 40 is then displayed on the control and display panel 34. FIG. 4 shows the sequence of events in block diagram form.

The electronic means 40 is shown schematically in block diagram form in FIG. 5. The output from the third transducer $26c$ is shown as $F_3$. The outputs from the first and second transducers $26a$ and $26b$ respectively, shown as $F_{4a}$ and $F_{4b}$ respectively, are entered into an adder 42. The function of the adder 42 is to add the signals from the first and second transducer, i.e., $F_{4a}$ and $F_{4b}$, in proportions such that the sum is in direct phase equivalent with the signal generated by the third transducer $26c$. Such an adder 42 is shown in U.S. Pat. No. 3,835,712 and U.S. Pat. No. 3,102,429 and is well known in the art. One such example of the adder 42 is shown in FIG. 6. Signals $F_{4a}$ and $F_{4b}$ pass through buffer amplifiers 110 which isolate the force signals $F_{4a}$ and $F_{4b}$ from the varying impedance of the circuit in the adder 42. Signals $F_{4a}$ and $F_{4b}$ are slightly leading and lagging force signal $F_3$ respectively, so the take-off point from the phase-adjustment potentiometer 112 can be adjusted to produce a signal directly in phase with $F_3$. The amplifier 114 after the phase-adjustment potentiometer 112 is an adjustable gain amplifier connected to give very high input impedance, thus not loading the phase-adjustment potentiometer 112. The gain-adjustment potentiometer 116 is used to adjust the amplitude of the composite $F_4$ signal to be in the correct proportion to signal $F_3$.

From the adder 42, the signals now represented by $F_3$ and $F_4$ are entered into a diameter compensator 44. The diameter compensator 44 divides the signal of the force of imbalance $F_3$ and $F_4$ by the size of the diameter of the wheel 12. The diameter of the wheel 12, of course, must be set by the operator. Such a a circuit is also well known in the art. One example for force $F_3$ is shown in FIG. 7. Another circuit is duplicated for signal $F_4$. In the operation of the diameter compensator 44, signal $F_3$ is interrupted by the analog switch 118 which in turn is actuated by a pulse-train with mark-space ratio proportional to 1/Diameter The average value of the output signal, after the high-frequency switching components have been filtered out is adjusted by the factor "k" which is the fractional "ON" time of the mark-space ratio, i.e.

$$\text{Output} = \text{Input} \times k$$

where $$k = \frac{\text{Time ON}}{\text{Time OFF} + \text{Time ON}}$$

Thus the output is proportional to $$F_3 \times \frac{1}{\text{Diameter}}$$

The analog switch 118 may be an industry standard part #4053.

Once the force signals are compensated by the diameter compensator 44, they are passed through a low pass filter 46. The low pass filter 46 eliminates high frequency electronic and electrical noise. Such a low pass filter 46 is shown in FIG. 8 and is also well known in the art. In FIG. 9, for clarity's sake, only one low-pass filter is shown for the signal $F_3$/Diameter from the diameter compensator 44. In the preferred embodiment, two filters are used, connected in series. In addition, two other filters are used for the signal $F_4$/Diameter from the diameter compensator 44. The 150k ohm and 2 meg ohm resistors serve to adjust the peaking and roll off of the filter.

From the low pass filter 46 the signals $F_3$ and $F_4$ enter into the calculator 48. The calculator 48 calculates the force of imbalance on the wheel 12 in accordance with the following formulas:

$$F_1 = \frac{1}{c} [a(F_3 + F_4) + fF_3] \qquad \text{(equation 1)}$$

$$F_2 = \frac{1}{c}[(a+c)(F_3+F_4) + fF_3] \quad \text{(equation 2)}$$

where $F_1$ is the magnitude of force of imbalance on the tire 14 on the outer rim, i.e., the side away from motor 18

$F_2$ is the magnitude of force of imbalance on the tire 14 on the inner rim, i.e., the side closer to the motor 18

$F_3$ is the magnitude of force experienced by third transducer 26c, as compensated by the diameter compensator 44.

$F_4$ is the magnitude of force experienced by first and second transducers 26a and 26b, corrected by adder 42, and the diameter compensator 44.

where:

a is the distance between $F_4$ and $F_2$, and varies from a minimum of two inches to a maximum of ten inches. There is a fixed component of two inches and a variable component of eight inches.

f is the distance between the sensors 26c and the midpoint of 26a and 26b and is a fixed distance of eight inches.

c is the distance between $F_2$ and $F_1$ and varies from 2 and ⅔ inches to a maximum of 18 and ⅔ inches. Thus, there is a fixed component of 2 and ⅔ inches and a variable component of 16 inches.

One example of the circuit for the calculator 48 is shown in FIG. 9. The calculator circuits are negative feedback amplifiers of known art. In this implementation, however, the input and feedback resistors are chopped with analog switches to vary their effective resistance values in such a way as to produce a calculation circuit analogous to the vector transformation relating the imbalance forces on the wheel to the forces perceived at the sensors. Basing all the distances on 8 inches as a unit, and using analog switches with their mark-space ratio directly proportional to the variable portions of "a" and "c", we can represent the additive quantity $a(F_3+F_4)+fF_3$ by the circuit shown in FIG. 9b. To divide this by "c" as required by equation 1 we replace the feed-back resistor "any" by the network shown in FIG. 9c. The resistance of the network of FIG. 9c is $$\frac{6R_2}{1+6c_1}$$

where "$c_1$" is the mark space ratio of the varying component of "c". This function varies from $6R_2$ to 6/7 times $R_2$ as "c" goes from zero to one. This is the required function for representing a variation in "c" from 2⅔ to 18⅔, also a ratio of 7:1. The resistor "$4R_1 R_1$" means an equivalent resistor having a resistance equal to $4R_1$ in parallel with $R_1$. For $F_2$ calculation an extra component must be added to represent the component $c(F_3+F_4)$. Since "c" varies by 16 inches total, i.e. twice the base unit of 8 inches, the resistors connected to the analog gates with mark space ratio representing the variation in "c" must be half the resistors tied to the "a" analog gates. Additional resistors of 4R and 3R, representing the fixed unvarying components of "a" and "c" are next included, and the circuit finally becomes that shown in FIG. 9d. The feedback capacitors are used to integrate the chopping irregularities which would otherwise pass through to the output.

From the calculator 48 the forces $F_1$ and $F_2$ are calculated and are entered into a high pass filter, half wave rectifier 50. The high pass filter, half-wave rectifier 50 is simply an amplifier stage that permits the rotation frequency component to be passed therethrough and thereafter half-wave rectified. One such example $F_1$ is shown in FIG. 10. There is a second similar circuit for $F_2$. During measurement, the two electrolytic capacitors 120 allow only the varying voltages from the calculator circuit to pass through to the buffer amplifier 122, while stopping direct non-varying voltages. Prior to measurement, the analog switch 124 is held closed, grounding the input to amplifier 122. This removes direct voltages from the calculator circuit. The long time-constant of the two capacitors 120 and the resistor 126 is such that the alternating voltages pass uninhibited. Amplifier 122 is connected as a buffer amplifier and passes the signal to the cross-over detector 63 (for imbalance location) and also to a half-wave rectifier circuit of known art comprising an amplifier 128 and rectifier 130. The output from that circuit is adjusted by a potentiometer 132 before passing to the speed compensator circuit 52.

Since the signal amplitude of the force varies as the square of the angular velocity of the wheel 12, $$F = mw^2r$$

m = mass of imbalance
w = angular velocity
r = radius of the rotating body to determine the mass of imbalance, i.e., $$m = F/w^2r$$

it is necessary to compensate for the variation in the radius (which was done by the diameter compensator 44) and the angular velocity by dividing the force signals by the angular velocity of the wheel 12 squared. In the electronic means 40 this is done in two stages. First, the speed compensator 52 divides the signal by the angular velocity of the wheel 12. One example of a speed compensator 52 for $F_1$ is shown in FIG. 11. A second circuit similar to that shown in FIG. 11 is for $F_2$. Analog switch 140 interrupts the current flowing from the half-wave rectifier 50 to the voltage-controlled oscillator 54 with a mark-space ratio (on time) as a proportion of (total cycle time) proportional to the inverse of wheel speed "c".

From the speed compensator 52, the signals are entered into a voltage controlled oscillator 54. The voltage controlled oscillator 54 is of a well known conventional type, whose pulse rate output is proportional to the average input signal. The resulting pulses are tabulated over time by the display counter 56. Because of the lengthening of the sinusoid as the angular velocity of the wheel 12 and signal frequency become slower, another compensating factor proprotional to the inverse of the angular velocity of the wheel 12 is introduced. Thus, the resulting readings displayed on the display 56 are compensated by a factor proportional to the inverse of the square of the angular velocity of the wheel 12. The readings are of the mass of the imbalance at the respective inner and outer rims of the wheel 12.

Figure 12:
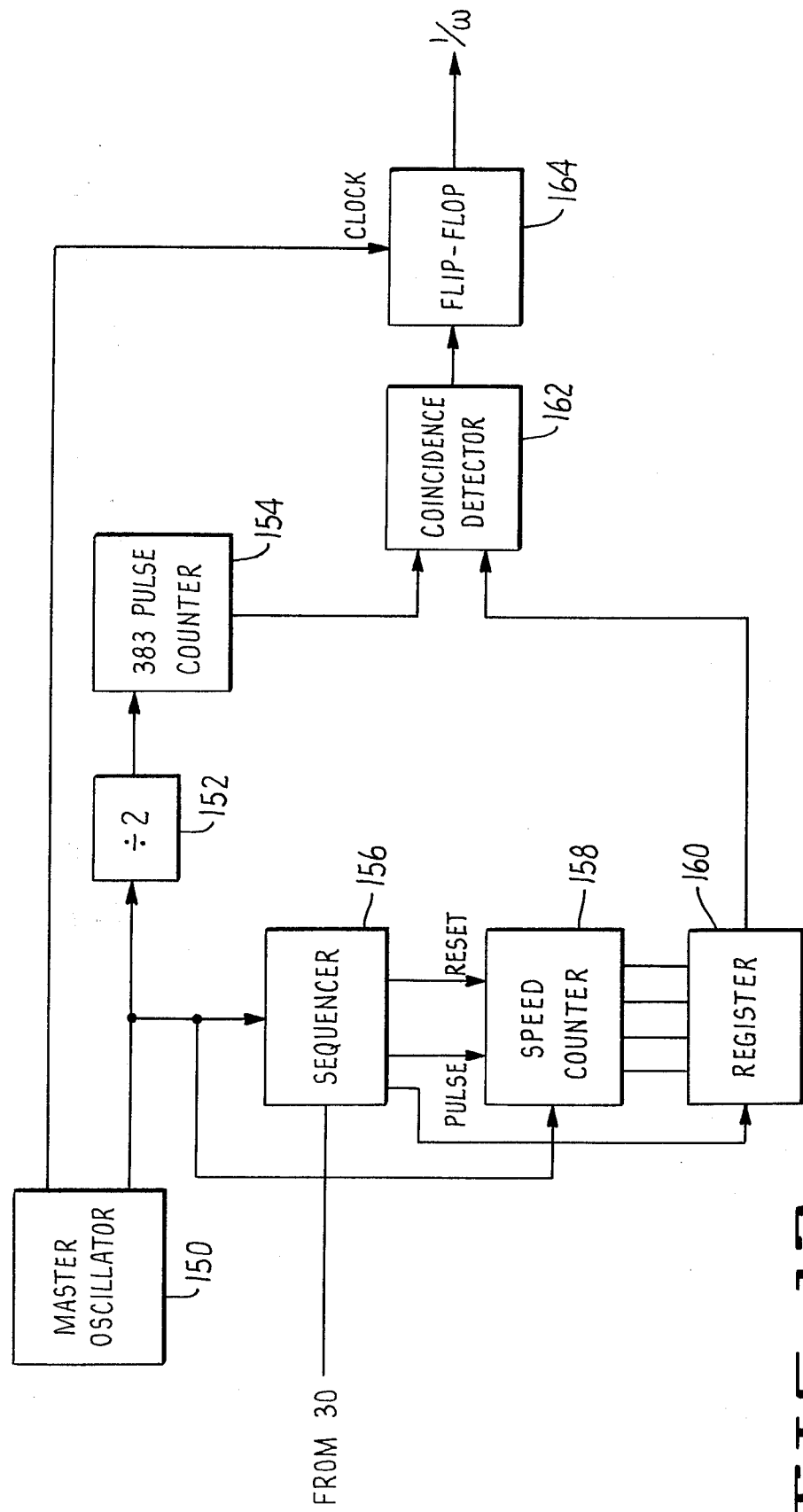
FIG. 12 is one embodiment of an inverse angular velocity calculator used in the present invention.

The electronic means 40 also comprises the signal from the optical sensor 30. The signal from the optical sensor 30 is used by the inverse angular velocity calculator 60 to calculate the inverse angular velocity of the wheel 12 which is used by the speed compensator 52. One example of the inverse angular velocity calculator 60 is shown in FIG. 12. 200 kHz pulses from the master oscillator 150 are divided by 2 by the divider 152 and then are fed to a free-running counter 154 which couto 384 pulses (zero to 383) and then resets. At the beginning of each optical sensor pulse from the sensor 30, pulses from the master oscillator 150, at the rate of 200 kHz, are fed by the sequencer 156 to speed counter 158. The sequencer 156 discontinues these pulses when the next optical sensor pulse begins. The number of pulses counted by the speed counter 158 during one complete optical sensor pulse will be inversely proportional to wheel speed, i.e. for faster wheel speeds there will be less pulses in the counter 158 and there will be more pulses for slower wheel speeds. The reset pulse from the sequencer 156 is used to transfer the contents of the speed counter 158 to the holding register 160 at the next oscillator pulse, and immediately thereafter to reset the speed counter 158 to zero. Ignoring the least significant bit, (to account for the divide-by-two circuit before the 384 counter 154), the contents of the speed counter 158 which have been transferred to the holding register 160 as described above, are compared with the count in the 384 counter 154. When coincidence occurs, the coincidence detector 162 causes the bistable stage "flip-flop" 164 to switch the output signal low. The output signal remains low until the 383 counter 154 reaches 0 and resets, at which time the output signal is switched high. The result is a wave-train. The period of the pulse train is equal to the counting period of the 383 counter. The duty cycle (on time as a proportion of total period) is proportional to the inverse of wheel speed.

From the optical sensor 30 the signal also enters into the velocity calculator 62 which determines the velocity of the rotating wheel 12 and which is also of known art. From the velocity calculator 62 the signal enters into the overspeed 64 which is used to control the power to he motor to shut it off when the rotating wheel is above the desired velocity. The overspeed 64 is also known in the art. The optical sensor 30 is also entered into an up/down counter 66, which also has inputs therein from the crossover detector 63. The up/down counter 66 operates to indicate the position of imbalance on the respective plane of the wheel. When the analog signal crosses through zero volts, the crossover detector 63 produces a pulse which resets the up-down counter 66 with a digital number set on the position "calibration switch". Thereafter as the teeth on the optical sensor wheel pass forward or backwards past the optical sensors, counts are added or subtracted to or from the up-down counter 66, thus keeping note of the actual position of the wheel, relative to the zero crossover. If the correct digital number has been set on the calibration switch, it is then possible to indicate by the display where the wheel should be positioned to have the imbalance at the lowest 'dead-center' position. In this implementation this occurs when the count is 04. At that time a green light on the display 56 is illuminated alone. Additionally for counts of one above or below this number a yellow display lamp is illuminated on the respective side of the green lamp, to show which way the wheel should be turned to bring the imbalance to bottom dead-center. For counts further removed from '04", the red lamps will be illuminated on the respective side. The counts which switch on the yellow, red and green lamps overlap somewhat to give the operator of the machine more 'feel' for bringing the wheel position to bottom dead-center as quickly and accurately as possible. The circuitry to implement this is of known art. The result is displayed on a position display 68.

It should be appreciated that while the foregoing description of the electronic means 40 has been described in reference to analog devices, the electronic means 40 may very well be implemented by digital techniques such as the use of microprocessors and associated memory. The use of microprocessors and other digital techniques would require additional shielding elements inasmuch as the environment in which the apparatus 10 of the present invention would operate in a very dirty electrical environment wherein numerous spurious electronic noises are present. However, it should be understood that the use of digital implementation is certainly within the scope of the present invention.

There are many advantages to the method and apparatus of the present invention. First and foremost is that there is no transmission system in the method and apparatus of the present invention. The transmission system of the prior art is a source of unreliability as well as expense and complexity. By mounting the rotating tire 14 directly on the shaft 16, a reduction in the number of parts required has been achieved. At the same time, reliability is improved because of the absence of wearing parts. Finally, unlike the apparatus of the prior art in which the magnitude of the force and consequently the mass of the imbalance is measured at predetermined velocities, the method and apparatus of the present invention measures and calculates the magnitude of the force of the imbalance and consequently the mass of the imbalance continuously, as the rotating wheel 12 decreases in its velocity. Imbalance signals taken during this so-called free-wheeling period have much less noise or error content than apparatus wherein the signals are taken at preselected velocities. The readings are averaged over a number of revolutions, thereby reducing any error in the system.

What is claimed is:

1. An apparatus to determine the imbalance in a rotating wheel said apparatus comprising:
    a solid shaft means for supporting said wheel;
    an eight pole asynchronous induction motor drive means directly connected to said shaft means, for acclerating said wheel to a predetermined speed;
    means for removing power to said drive means; and
    force transducer means for continuously measuring the magnitute of the imbalance of the wheel as the velocity of the wheel decreases.

2. The apparatus of claim 1 further comprising:
    rotational angle transducer means for determining the angular position of the imbalance.

3. The apparatus of claim 2 further comprising:
    electronic means for calculating the magnitude and angular position of said imbalance based upon said force and said angle transducer means.

4. The apparatus of claim 3 further comprising:
    display means for displaying the calculated values from said electronic means.

5. The apparatus of claim 4 wherein said electronic means calculates the magnitude of the force of imbalance of said wheel in accordance with either of the following formulas:

$$F_1 = \frac{1}{c} [a(F_3 + F_4) + fF_3]$$

$$F_2 = \frac{1}{c} [(a + c)(F_3 + F_4) + fF_3]$$

where
$F_1$ is the magnitude of force of imbalance of the wheel on the side away from the drive means
$F_2$ is the magnitude of imbalance of the object wheel on the side closer to the drive means
$F_3$ is the magnitude of force experienced by one of said force transducer means
$F_4$ is the magnitude of force experienced by another one of said force transducer means
where
a is the distance between $F_4$ and $F_2$
f is the distance between $F_3$ and $F_4$
c is the distance between $F_2$ and $F_1$.

6. The apparatus of claim 5 wherein said electronic means further comprises means for determining the velocity of said wheel.

7. The apparatus of claim 6 wherein said electronic means further comprises means for calculating the mass of said imbalance as a function of the velocity of rotation of said wheel.

8. The apparatus of claim 7 wherein said mass calculation comprises dividing said magnitude of force by velocity squared and by the radius of said wheel.

9. The apparatus of claim 8 wherein said velocity is determined based on said rotational angle transducer means.

10. The apparatus of claim 9 wherein said force transducer means is a plurality of force transducers positioned to support said drive means and to measure the magnitude of imbalance of the wheel.

11. The apparatus of claim 10 wherein the number of transducers is three.

12. The apparatus of claim 11 wherein said transducers are positioned such that
two of said transducers are in a line substantially perpendicular to said support means under said drive means and closer to said wheel than the third transducer.

13. The apparatus of claim 9 wherein said rotational angle transducer means further comprises:
a rotary shutter attached to said drive means; and
sensing means to detect the position of said wheel.

14. A method to determine the imbalance in a wheel rotating about a shaft, said method comprising:
directly connecting said shaft to an eight pole asynchronous induction motor drive means to rotate said wheel to a predetermined speed;
accelerating said wheel to a velocity;
removing power to said drive means; and
continuously measuring the magnitude of force of imbalance of said wheel as the velocity of said wheel decreases.

15. The method of claim 14 further comprising determing the angular position of the imbalance.

16. The method of claim 15 further comprising calculating the magnitude and the angular position of the force of imbalance based on the measurement and the angular position of the imbalance.

17. The method of claim 16 further comprising determining the velocity of said wheel.

18. The method of claim 17 further comprising calculating the mass of said imbalance based upon the magnitude of the force of imbalance and the velocity of the wheel.

19. The method of claim 18 further comprising displaying the calculation of the mass of imbalance.

20. An apparatus to determine the imbalance in a rotating object, said apparatus comprising:
means for supporting said object;
drive means directly coupled to said support means for accelerating said object to a predetermined speed;
means for removing power to said drive means;
three force transducer means each for continuously measuring the magnitude of the imbalance of the object as the velocity of the object decreases, a first force transducer means and a second force transducer means positioned in a line substantially perpendicular to said support means and for generating a first and a second signal respectively; a third force transducer means positioned spaced apart from said line and for generating a third signal;
rotational angle transducer means for geneating a rotational signal in response to the rotation of said object;
electronic means for receiving said first, second and third signals, and said rotational signal and for calculating the magnitude and angular position of said imbalance, in response thereto; said electronic means comprising:
adder means for receiving said first and second signals and for generating an average signal in response thereto;
diameter compensator means for receiving said average signal, said third signal and a signal representative of the diameter of said object; said compensator means for generating a modified third signal ($F_3$) and a modified average signal ($F_4$) in response thereto; said modified third signal being said third signal divided by said signal representative of the diameter; said modified average signal being said average signal divided by said signal representation of said diameter;
calculator means for receiving data on the width (c) of the object, the distance (f) between the third transducer means to the midpoint between the first and the second transducer means, and the distance (a) between the midpoint of the first and second transducer means and the side of the object closer to the drive means, and said modified third signal ($F_3$) and the modified average signal ($F_4$) and for generating a first imbalance signal ($F_1$) and a second imbalance signal ($F_2$) in response thereto and in accordance with the following formulas;

$$F_1 = \frac{1}{C} [a(F_3 + F_4) + fF_3]$$

$$F_2 = \frac{1}{C} [(a + c)(F_3 + F_4) + fF_3]$$

means for receiving said rotational signal and for generating an inverse velocity signal in response thereto;
velocity compensating means for receiving said first and second imbalance signals and inverse velocity signal and for generating a first and a second mass imbalance signals in response thereto;
position calculating means for receiving said rotational signal and for generating a rotational position signal to determine the rotational position of the imbalance of said object; and display means for displaying said first and second mass imbalance signals and said rotational position signal.

21. The apparatus of claim 20 wherein said velocity compensating means further comprising:

a switch means for interrupting the current flow with a ratio of "on time" to "total cycle time" proportional to the inverse velocity signal; and a voltage control oscillator means for receiving the output of said switch means and for supplying first and second mass imbalance signals to said display means.

22. The apparatus of claim 20 further comprising: first filter means for filtering said modified third signal and the modified average signal and for supplying said filtered signals to said calculator means.

23. The apparatus of claim 22 wherein said first filter means is a low pass filter.

24. The apparatus of claim 20 further comprising second filter means for filtering said first and second imbalance signals and for supplying said filtered signals to said velocity compensating means.

25. The apparatus of claim 24 wherein said second filter means is a high pass filter, half wave rectifier.

26. The apparatus of claim 20 further comprising:

velocity calculating means for receiving said rotational signal and for generating a velocity signal in response thereto;

overspeed means for receiving said velocity signal and for automatically activating said power removing means when said velocity is above the desired velocity.

* * * * *